US011152829B2

United States Patent
Yuan et al.

(10) Patent No.: US 11,152,829 B2
(45) Date of Patent: Oct. 19, 2021

(54) NESTED WINDING FOR SLOTLESS MOTOR

(71) Applicant: Shanghai Moons' Electric Co., Ltd., Shanghai (CN)

(72) Inventors: Bang Yuan, Shanghai (CN); Binsong Tang, Shanghai (CN); Xiaotian Tan, Shanghai (CN); Wanbing Jin, Shanghai (CN)

(73) Assignee: SHANGHAI MOONS' ELECTRIC CO., LTD., Shanghai (CN)

( * ) Notice: Subject to any disclaimer, the term of this patent is extended or adjusted under 35 U.S.C. 154(b) by 270 days.

(21) Appl. No.: 16/259,788

(22) Filed: Jan. 28, 2019

(65) Prior Publication Data

US 2019/0173346 A1     Jun. 6, 2019

Related U.S. Application Data

(63) Continuation of application No. PCT/CN2018/082328, filed on Apr. 9, 2018.

(30) Foreign Application Priority Data

Aug. 1, 2017    (CN) .......................... 201710646697.3

(51) Int. Cl.
  *H02K 3/47*    (2006.01)
  *H02K 3/42*    (2006.01)
  *H02K 3/28*    (2006.01)

(52) U.S. Cl.
  CPC ................. *H02K 3/47* (2013.01); *H02K 3/28* (2013.01); *H02K 3/42* (2013.01)

(58) Field of Classification Search
  CPC .. H02K 3/47; H02K 3/28; H02K 3/42; H02K 3/34; H02K 3/46; H02K 3/32; H02K 11/02
  See application file for complete search history.

(56) References Cited

U.S. PATENT DOCUMENTS

| 4,543,507 A | 9/1985 | Heyraud | |
| 6,791,224 B1 * | 9/2004 | Ozawa | H02K 3/04 29/596 |

(Continued)

FOREIGN PATENT DOCUMENTS

| CN | 1960129 A | 5/2007 |
| CN | 200997542 Y | 12/2007 |

(Continued)

*Primary Examiner* — Tran N Nguyen
*Assistant Examiner* — Leda T Pham
(74) *Attorney, Agent, or Firm* — Hamre, Schumann, Mueller & Larson, P.C.

(57) ABSTRACT

The invention relates to a nested winding for a slotless motor. The nested winding is formed by inner and outer windings which are nested together and have different inner and outer diameters, wherein the number of the inner and outer windings is n, same-phase coils are connected in parallel or in series, and the number n of the nested inner and outer windings is equal to or greater than two. Compared with the prior art, the nested winding has the following advantages: a potential difference between the coils connected in parallel can be effectively reduced, and accordingly, the loss of the winding is reduced, and the high-speed operating performance of the motor is improved.

9 Claims, 7 Drawing Sheets

(56) References Cited

U.S. PATENT DOCUMENTS

| | | | | |
|---|---|---|---|---|
| 2005/0225197 A1* | 10/2005 | Nagano | ............... | H01F 41/061 |
| | | | | 310/254.1 |
| 2007/0103025 A1* | 5/2007 | Rohrer | ............... | H02K 3/47 |
| | | | | 310/179 |
| 2007/0138897 A1* | 6/2007 | Asaba | ............... | A61P 25/14 |
| | | | | 310/208 |
| 2009/0315427 A1* | 12/2009 | Seo | ............... | H02K 3/47 |
| | | | | 310/195 |
| 2014/0125186 A1* | 5/2014 | Takahashi | ............... | H02K 3/28 |
| | | | | 310/202 |

FOREIGN PATENT DOCUMENTS

| | | |
|---|---|---|
| CN | 103138506 A | 6/2013 |
| CN | 203104163 U | 7/2013 |
| CN | 103280905 A | 9/2013 |
| CN | 105762962 A | 7/2016 |
| CN | 105790540 A | 7/2016 |
| CN | 106340986 A | 1/2017 |
| CN | 106340987 A | 1/2017 |
| JP | 2010004729 A | 1/2010 |

\* cited by examiner

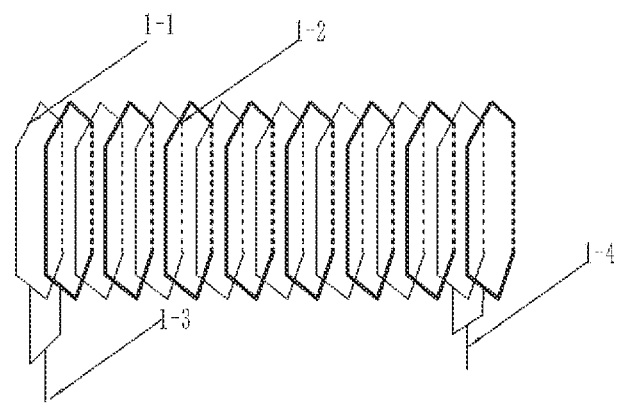
FIG. 1    -Prior Art-
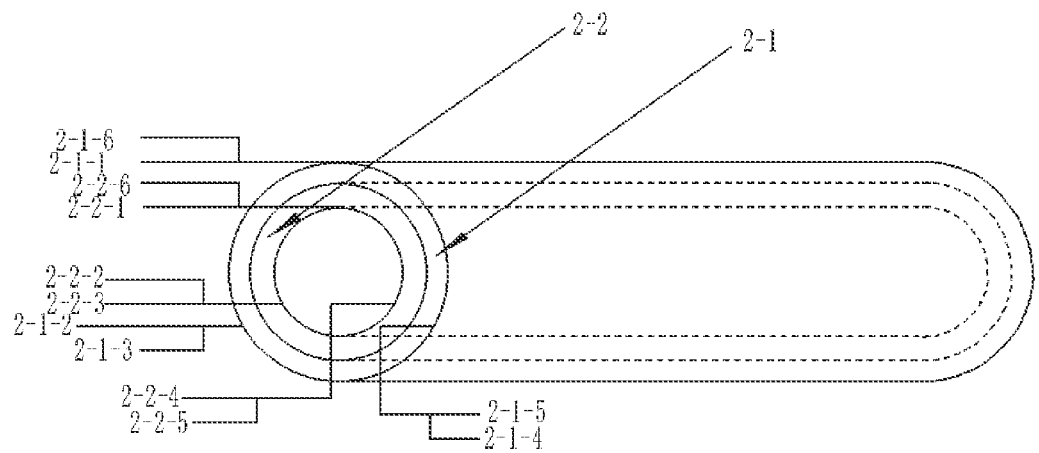
FIG. 2
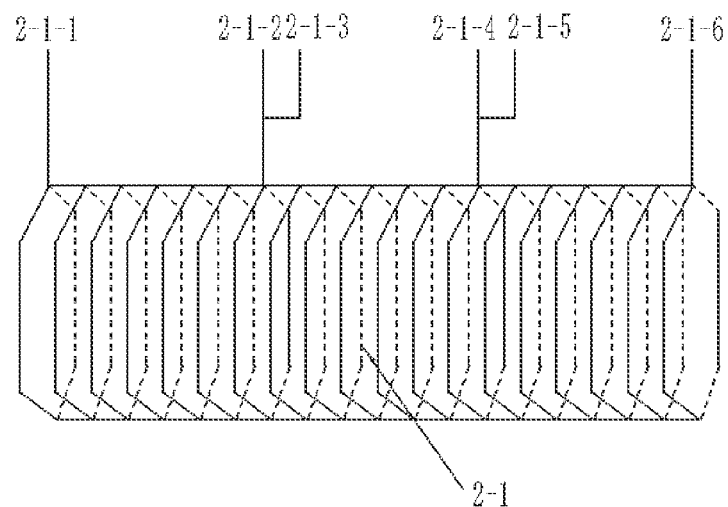
FIG. 3A

NESTED WINDING FOR SLOTLESS MOTOR

BACKGROUND OF THE INVENTION

Technical Field

The invention relates to a motor winding, in particular to a nested winding for a slotless motor.

Description of Related Art

Slotless permanent magnet motors mainly comprise a stator core, a stator winding, a rotor core and a rotary shaft, wherein the winding is the core component of the slotless permanent magnet motors.

As shown in FIG. 1, due to the fact that the winding of traditional coreless motors (such as U.S. Pat. No. 4,543,507) is directly exposed in an air-gap magnetic field, a very large eddy-current loss will be generated in a high-speed rotating magnetic field, and thus, coils have to be made from thin copper wires. Based on this requirement, in order to make full use of the spaces of the stator and rotor of motors, multiple thin copper wires are wound in parallel to manufacture coils. However, as for a traditional lap winding comprising coils made from multiple thin copper wires, a phase difference will be generated in the coils made from multiple parallel wires. If two coils are connected in parallel, the phase difference will cause internal loop currents, which in turn result in losses.

Patents US20090315427, US20070103025 and CN200610136515.X reduce eddy currents caused by concentric windings in slotless motors. However, these patents are only suitable for concentric windings and are not suitable for lap windings or slanting windings, and the problems caused when the lap windings and slanting windings are applied to the slotless motors are still left unsolved.

Moreover, in Patents US20070103025 and CN200610136515.X, a plurality of windings need to be assembled and rounded in the winding manufacturing process, and this process is very difficult; and meanwhile, coils can only be of a rhombic structure and thus are not suitable for hexagonal windings. Patents CN201310021865.1 and CN201310188734.2 provide a winding method of slotless windings and a combination method of different windings, but these two patents still fail to solve the technical problems of the slotless motors caused under a high power and high rotating speed.

FIG. 1 is an view of a traditional lap winding formed by two coils, wherein 1-1 is a first parallel-wound coil, 1-2 is a second parallel-wound coil, and the wire thicknesses are only used to distinguish the two coils, but do not represent the wire diameters; and 1-3 is a first winding tap, and 1-4 is a second winding tap. According to the traditional multi-coil lap winding, because the coil 1-1 is spatially ahead of the coil 1-2 by one phase, bemf is generated by the coil 1-1 and results in a phase difference between the coil 1-1 and the coil 1-2 when a magnetic field is applied to the coils. This phase difference will lead to internal loop currents in the winding after the coils are connected in parallel.

BRIEF SUMMARY OF THE INVENTION

The objective of the invention is to overcome the aforesaid technical defects of the prior art by providing a nested winding for a slotless motor.

The objective of the invention is fulfilled through the following technical scheme:

A nested winding for a slotless motor is formed by inner and outer windings which are nested together and have different inner and outer diameters, wherein the number of the inner and outer windings is n, same-phase coils are connected in parallel or in series, and the number n of the nested inner and outer windings is equal to or greater than two.

The nested inner and outer windings are lap windings, slanting windings, or concentric windings.

The coils are formed by round wires, flat wires or multi-strand wires.

The coils in each of the nested inner and outer windings are connected in Star or delta as needed.

The n inner and outer windings having different inner and outer diameters are connected in series or parallel as needed. If the coils in different windings need to be connected in parallel, the same-phase coils to be connected in parallel have identical resistances, inductances, bemf values and phase angles under the same rotating speed, or the differences between the resistances, inductances, bemf values and phase angles of the same-phase coils to be connected in parallel are smaller than set thresholds.

After the same-phase coils are connected in series, coil sets formed by the series-connected coils are connected in Star or delta as needed.

The coils are single-wire coils or multi-wire coils. If the coils are multi-wire coils, the same-phase coils located in different windings are connected in series following the rule that the bemf values and phases of coil sets are the same after connection, so the coil sets can be connected in parallel or in series to form one phase of winding. For instance, if the coils are formed by m wires, the coils with different inner and outer diameters and the same phase are connected in series, and after being connected in series, the coils are still formed by m wires having identical or very close resistances, inductances and bemf values at the same speed, and then the m same-phase wires are connected in parallel.

If the coils are multi-wire coils, the multi-wire coils have identical or different wire diameters.

Each coil is rhombic, hexagonal, polygonal or in other shapes.

Each of the coils forming the multi-phase winding has a phase spread of 60° or 120°. The winding is formed by 3*k basic coils, wherein k is 1, 2, 3, 4 . . . .

Compared with the prior art, the invention has the following advantages:

1. By adoption of the slotless winding of the invention, the potential difference between coils connected in parallel can be effectively reduced, and accordingly, the loss of the winding is reduced, and the high-speed operating performance of the motor is improved.

2. By adoption of the slotless winding of the invention, the slot occupation of the slotless winding can be effectively improved, the radial and circumferential spaces of the motor are fully used, the resistance of the winding is reduced, and the operating efficiency of the motor is improved;

3. By adoption of the slotless winding of the invention, the voltage level of the motor can be improved, and product lines are enriched.

4. The winding of the invention can be in various shapes, for instance, the winding is rhombic, hexagonal or the like.

5. The process of the slotless winding of the invention is simple, the windings on different layers can be individually manufactured in the same way as traditional slotless winding;

6. The slotless winding of the present invention can be formed through a simple process by connecting same-phase coils or coil sets having different inner and outer diameters in parallel.

7. The winding of the invention has wide applicability and can be applied to multi-phase motors.

8. The winding of the invention can be in various forms, the windings to be nested can be formed by multiple coils such as three coils or six coils.

9. The winding of the invention can be formed by a single wire or multiple wires, so that motors can be better used at a high speed.

10. The winding of the invention can be made from various wires such as round enameled wires, flat copper wires or multi-strand wires.

BRIEF DESCRIPTION OF THE SEVERAL VIEWS OF THE DRAWINGS

FIG. 1 is a view of an existing lap winding formed by two coils, wherein 1-1 is a first parallel-wound coil, 1-2 is a second parallel-wound coil, 1-3 is a first winding tap, and 1-4 is a second winding tap;

FIG. 2 is a view of a slotless winding formed by two lap windings in embodiment 1;

Figure 3B:
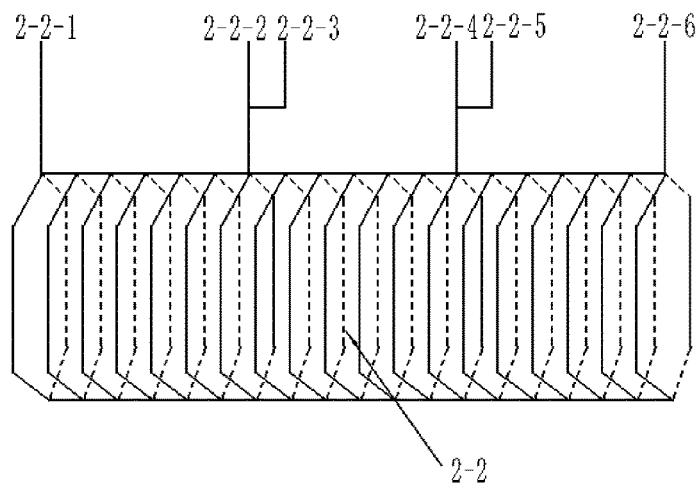
Figure 4:
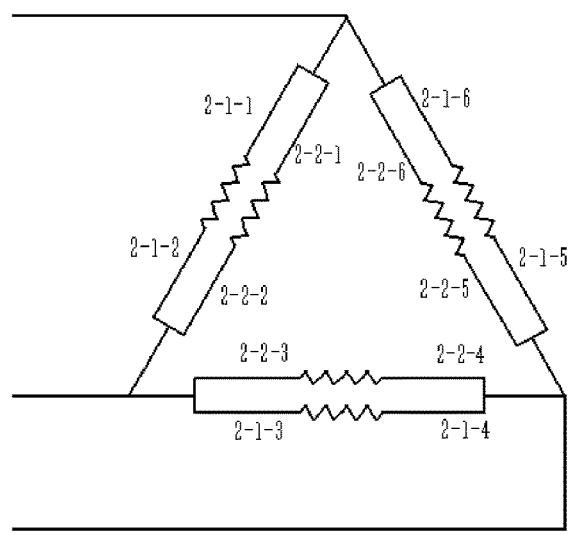
Figure 5:
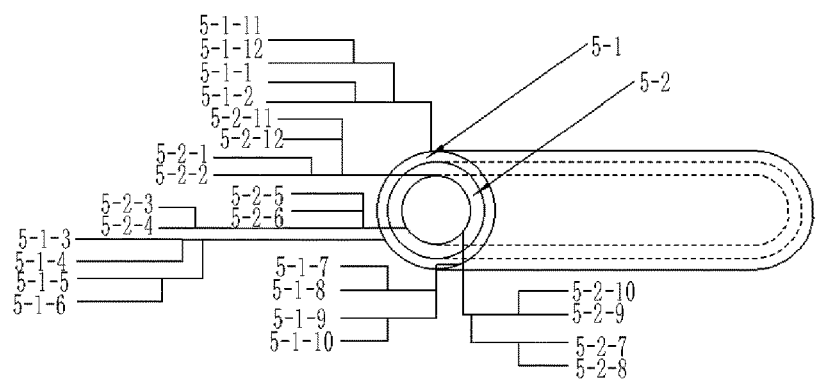
Figure 6A:
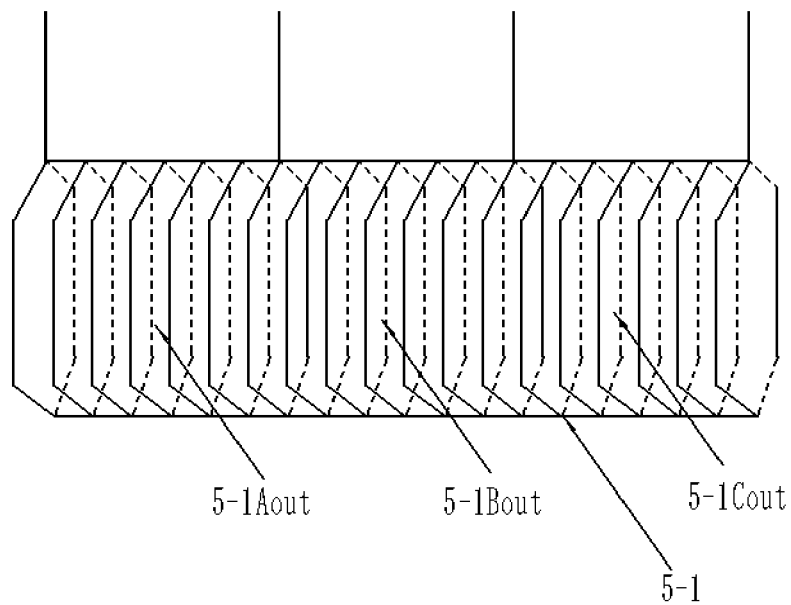
Figure 6B:
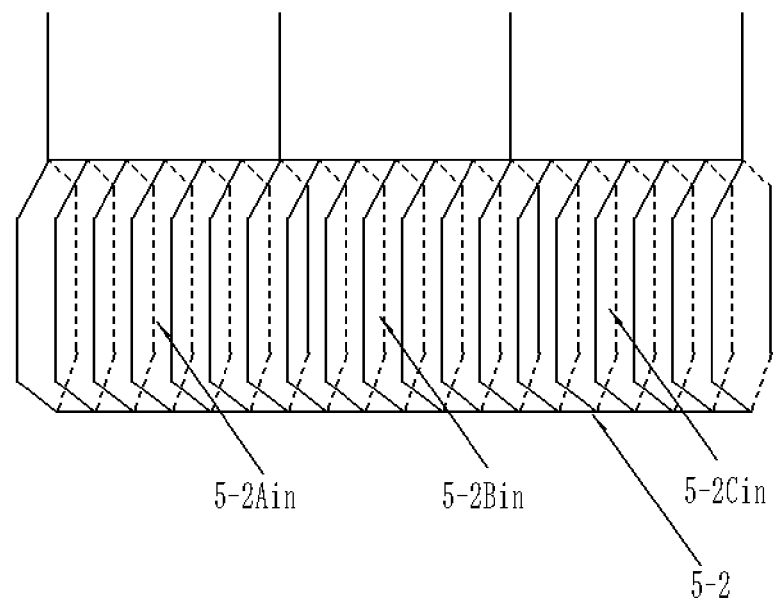
Figure 7A:
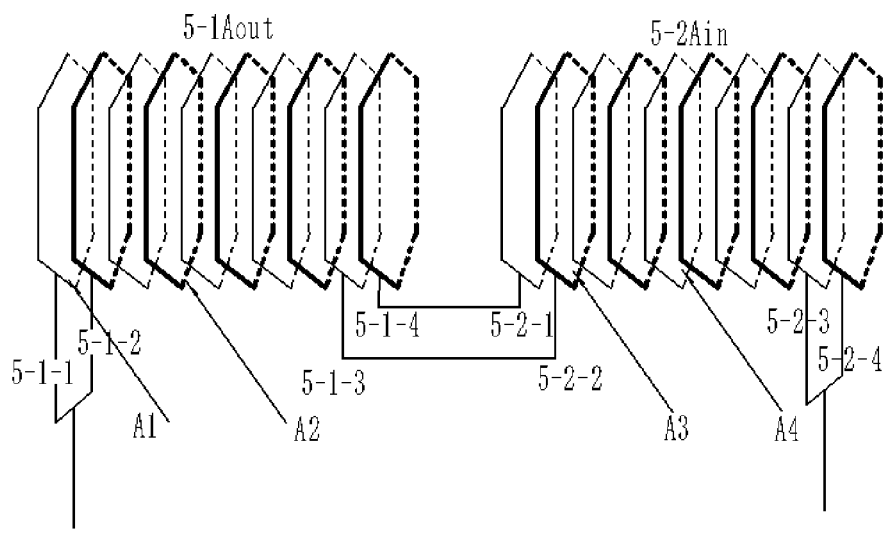
Figure 7B:
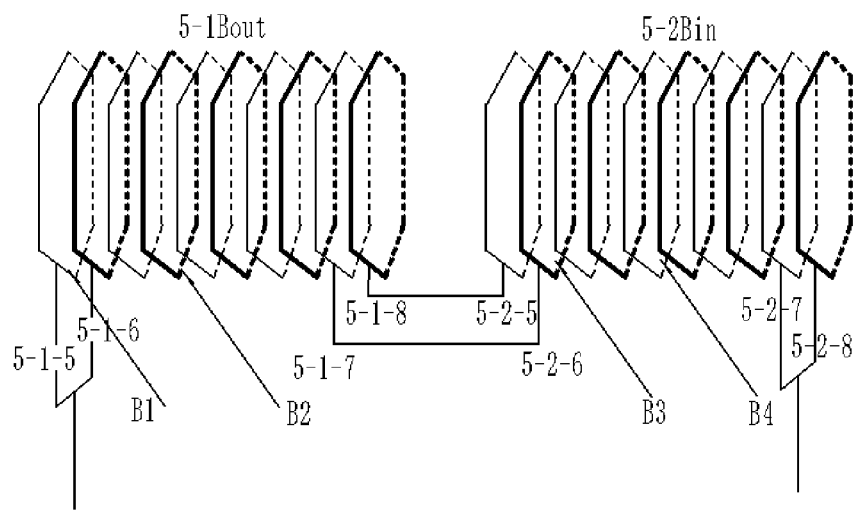
Figure 7C:
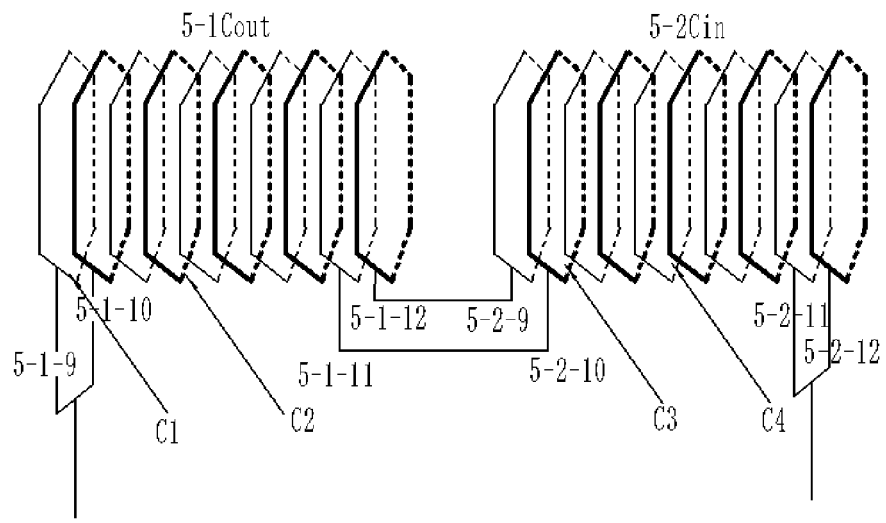
Figure 8A:
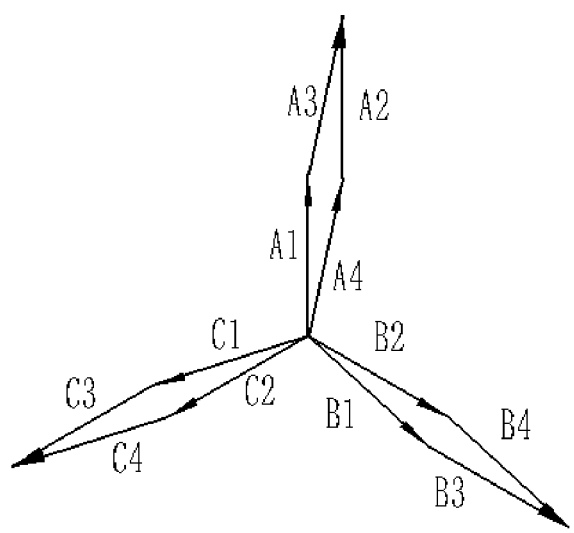
Figure 8B:
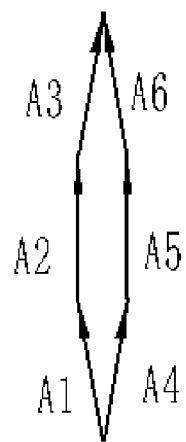
Figure 8C:
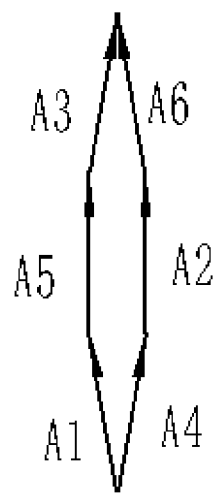
Figure 8D:
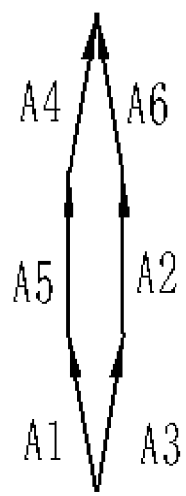
Figure 9:
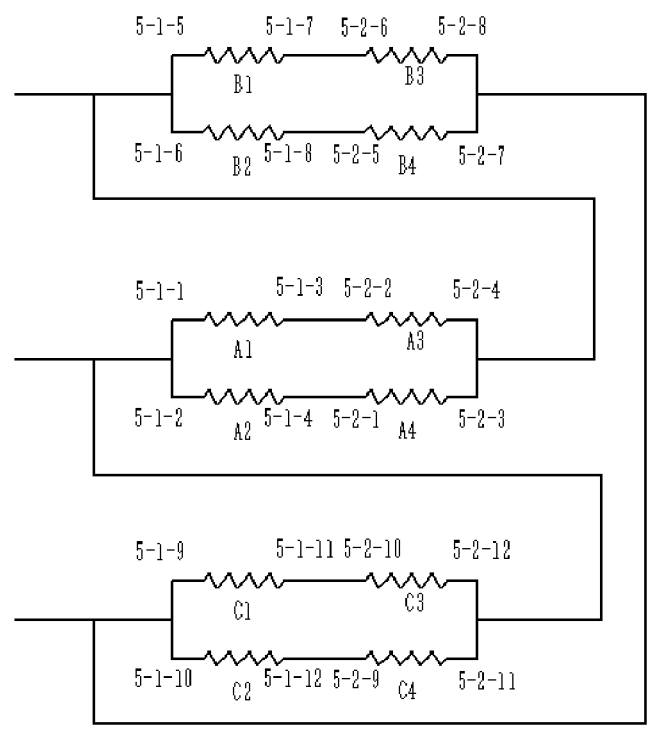

Wherein, 2-1 is an outer winding, 2-2 is an inner winding, 2-1-1~2-1-6 are taps of the outer three-phase winding, and 2-2-1~2-2-6 are taps of the inner three-phase winding;

FIG. 3A is a view of the outer winding in embodiment 1;

FIG. 3B is a view of the inner winding in embodiment 1;

FIG. 4 is a view of the same-phase windings parallelly connected in delta in embodiment 1;

FIG. 5 is a view of a slotless winding in embodiment 2;

Wherein, 5-1 is an outer winding, 5-2 is an inner winding, 5-1-1~5-1-12 are taps of the outer winding, and 5-2-1~5-2-12 are taps of the inner winding;

FIG. 6A is a view of the outer winding in embodiment 2;

FIG. 6B is a view of the inner winding in embodiment 2;

FIG. 7A is a view of an A-phase winding in embodiment 2;

FIG. 7B is a view of a B-phase winding-in embodiment 2;

FIG. 7C is a view of a C-phase winding in embodiment 2;

FIG. 8A is a bemf vector diagram of coils in the winding in embodiment 2;

FIGS. 8B-D are vector diagrams of coils, from one phase and formed by three parallel wires, of the two windings, wherein as shown in FIG. 8B, three A-phase coils A1, A2 and A3 of the outer winding are connected in series, three A-phase coils A4, A5 and A6 of the inner winding are connected in series, and then series-connected coils of the inner winding and the series-connected coils of the outer winding are connected in parallel; in FIG. 8C, the three coils A1, A5 and A3 are connected in series, the coils A4, A2 and A6 are connected in series, and then the series-connected coils are connected in parallel; and in FIG. 8D, the three coils A1, A5 and A4 are connected in series, the three coils A3, A2 and A6 are connected in series, and then the series-connected coils are connected in parallel;

FIG. 9 is a coil connection diagram drawn based on the principle in FIG. 8.

DETAILED DESCRIPTION OF THE INVENTION

A clear and complete description of the technical scheme of embodiments of the invention is given as follows with reference to the accompanying drawings of the embodiments. Apparently, the embodiments in the following description are only part illustrative ones and are not all possible ones of the invention. All other embodiments obtained by those ordinarily skilled in this field based on these embodiments without creative work should fall within the protection scope of the invention.

Based on the above background, a slotless winding capable of restraining internal loop currents is designed according to the phase relation of bemf in coils. The winding of the invention is formed by a plurality of nested windings with different inner and outer diameters. If the windings are single-wire windings, same-phase coils in the windings are connected in parallel to form one phase of winding, wherein the coils connected in parallel have identical or very close resistances, inductances, bemf phases and magnitudes; and finally, different phases of windings are connected in delta or Star.

The inner and outer windings of the present invention can also be multi-wire windings with different or identical wire diameters. In this case, same-phase coils in the inner and outer windings are connected in a manner specified by this patent to form one phase of winding, and then different phases of windings are connected in delta or Star;

Based on the principle of this patent, the nested inner and outer windings can also be made from flat copper wires or multiple stranded wires.

Embodiment 1

FIG. 2 shows a slotless winding formed by two lap winding. An outer winding 2-1 and an inner winding 2-2 are both lap windings. The outer winding is a three-phase winding (the outer winding can also be a multi-phase winding in actual application). As shown in FIG. 3A, the outer three-phase winding comprises taps 2-1-1~2-1-6, wherein a coil A1 is located between the tap 2-1-1 and the tap 2-1-2, a coil B1 is located between the tap 2-1-3 and the tap 2-1-4, and a coil C1 is located between the tap 2-1-5 and the tap 2-1-6. As shown in FIG. 3B, the inner winding is a three-phase winding (the inner winding can also be a multi-phase winding in actual application) and comprises taps 2-2-1~2-2-6, wherein a coil A2 is located between the tap 2-2-1 and the tap 2-2-2, a coil B2 is located between the tap 2-2-3 and the tap 2-2-4, and a coil C2 is located between the tap 2-2-5 and the tap 2-2-6.

Each of the coils A1, B1, C1, A2, B2 and C2 has a spatial angle of 120° (in actual application, each winding can be formed by six coils having a spatial angle of 60°, or other schemes can be adopted).

The coil A1 and the coil A2 are connected in parallel, the coil B1 and the coil B2 are connected in parallel, the coil C1 and the coil C2 are connected in parallel, and then, all the parallel-connected coils are connected in delta, as shown in FIG. 4. In actual application, the coils can also be connected in Star as needed.

Each coil is made from a single cement wire, a single flat copper wire, or multiple copper wires.

The number of the nested windings is at least two.

Embodiment 2

Embodiment 2 is similar to embodiment 1 in outline, as shown in FIG. 5. However, in embodiment 2, the inner and outer windings which are nested together are two-wire windings. In actual application, the inner and outer windings can also be three-wire or four-wire windings.

In the prior art, there is an angle difference between the windings connected in parallel due to the spatial layout, this angle difference will result in a bemf phase difference in time after bemf is sensed, and consequentially, an extra loss of the windings will be caused if the windings are connected in parallel. In this embodiment, two winding are adopted, and each winding is a three-phase two-wire winding, as shown in FIG. 5.

An outer winding 5-1 is formed by three phases of windings, which are respectively a winding 5-1Aout, a winding 5-1Bout and a winding 5-1Cout, and each winding has an angle of 120°, as shown in FIG. 6A. Each phase of winding is formed by two wires, namely a thick wire and a thin wire in FIG. 7, but the thicknesses in FIG. 7 do not represent the wire diameters and are only used for distinguishing the two wires.

An inner winding 5-1 is formed by three phases of windings, which are respectively a winding 5-2Aout, a winding 5-2Bout and a winding 5-2Cout, and each of the three phases of windings has an angle of 120°, as shown in FIG. 6B. Each phase of winding is formed by two wires, namely a thick wire and a thin wire in FIG. 7, but the thicknesses in FIG. 7 do not represent the wire diameters and are only used for distinguishing the two wires.

5-1-1~5-1-12 are taps of the outer winding. A coil A1 is located between the tap 5-1-1 and the tap 5-1-3, a coil A2 is located between the tap 5-1-2 and the tap 5-1-4, a coil B1 is located between the tap 5-1-5 and the tap 5-1-7, a coil B2 is located between the tap 5-1-6 and the tap 5-1-8, a coil C1 is located between the tap 5-1-9 and the tap 5-1-11, and a coil C2 is located between the tap 5-1-10 and the tap 5-1-12, as shown in FIGS. 7A-C.

5-2-1~5-2-12 are taps of the inner windings. A coil A4 is located between the tap 5-2-1 and the tap 5-2-3, and a coil A3 is located between the tap 5-2-2 and the tap 5-2-4; a coil B4 is located between the tap 5-2-5 and the tap 5-2-7, and a coil B3 is located between the tap 5-2-6 and the tap 5-2-8; and a coil C4 is located between the tap 5-2-9 and the tap 5-2-11, and a coil C3 is located between the tap 5-2-10 and the tap 5-2-12, as shown in FIGS. 7A-C.

FIG. 8A is a bemf vector diagram of the coils of the winding. The coils A1 and A3 are connected in series, the coils A2 and A4 are connected in series, and coil sets formed by the series-connected coils have the same phase and are connected in parallel to form an A-phase winding. The coils B1 and B3 are connected in series, the coils B2 and B4 are connected in series, and coil sets formed by the series-connected coils have the same phase and are connected in parallel to form a B-phase winding. The coils C1 and C3 are connected in series, the coils C2 and C4 are connected in series, and coil sets formed by the series-connected coils have the same phase and are connected in parallel to form a C-phase winding. FIG. 9 is the coil connection diagram drawn based on the principle in FIG. 8. In actual application, the windings can also be formed by more than two wires based on the above principle.

FIGS. 8B-D are vector diagrams of coils, from one phase and formed by three parallel wires, of the two windings. A1, A2 and A3 are three coils of the outer winding, wherein the coils A1, A2 and A3 are sequentially arrayed to form an A-phase outer winding; A4, A5 and A6 are three coil of the inner winding, and the coils A4, A5 and A6 are sequentially arrayed to form an A-phase inner winding. As shown in FIG. 8B, the three coils A1, A2 and A3 of the A-phase outer winding are connected in series, the three coils A4, A5 and A6 of the A-phase inner winding are connected in series, and then a coil set formed by the series-connected coils A4, A5 and A6 of the inner winding and a coil set formed by the series-connected coils A1, A2 and A3 of the outer winding are connected in parallel. As shown in FIG. 8C, the three coils A1, A5 and A3 are connected in series, the three coils A4, A2 and A6 are connected in series, and then a coil set formed by the series-connected coils A1, A5 and A3 and a coil set formed by the series-connected coils A4, A2 and A6 are connected in parallel. As shown in FIG. 8D, the three coils A1, A5 and A4 are connected in series, the three coils A3, A2 and A6 are connected in series, and then a coil set formed by the series-connected coils A1, A5 and A4 and a coil set formed by the series-connected coils A3, A2 and A6 are connected in parallel. The three coils A6, A5 and A4 are connected in series, the three coils A3, A2 and A1 are connected in series, and then a coil set formed by the series-connected coils A6, A5 and A4 and a coil set formed by the series-connected coils A3, A2 and A1 are connected in parallel in any of the four following manners to form one phase of winding. The connected coils have the same phase and thus can be wound in parallel.

The above description only refers to specific embodiments of the invention, but the protection scope of the invention is not limited to the above description. Various equivalent modifications or substitutes which can be easily obtained by any skilled in this technical field within the technical scope disclosed by the invention should fall within the protection scope of the invention. Thus, the protection scope of the invention should be subject to the protection scope defined by the claims.

What is claimed is:

1. A nested winding for a slotless motor, formed by inner and outer windings which are nested together and have different inner and outer diameters,
    wherein the number of the inner and outer windings is n, same-phase coils are connected in parallel or in series, and the number n of the nested inner and outer windings is equal to or greater than two,
    wherein the coils are multi-wire coils; the same-phase coils located in different windings are connected in series following the rule that bemf values and phases of coil sets are the same after connection, so the coil sets are connected in parallel to form one phase of winding,
    wherein the n inner and outer windings are on n layers, respectively,
    each layer of the n layers includes six coils of three-phase windings, and
    the six coils on each layer of the n layers form a loop in an end view.

2. The nested winding for a slotless motor according to claim 1, wherein the nested inner and outer windings are lap windings, slanting windings or concentric windings.

3. The nested winding for a slotless motor according to claim 1, wherein the coils are formed by round wires, flat wires or multi-strand wires.

4. The nested winding for a slotless motor according to claim 1, wherein the coils in each of the nested inner and outer windings are connected in Star or delta as needed.

5. The nested winding for a slotless motor according to claim 1, wherein the n inner and outer windings having different inner and outer diameters are connected in series or parallel as needed; if the coils in different windings need to be connected in parallel, the same-phase coils to be connected in parallel have identical resistances, inductances, bemf values and phase angles under a same rotating speed, or the differences between the resistances, inductances, bemf values and phase angles of the same-phase coils to be connected in parallel are smaller than set thresholds.

6. The nested winding for a slotless motor according to claim 1, wherein after the same-phase coils are connected in series, coil sets formed by the series-connected coils are connected in Star or delta as needed.

7. The nested winding for a slotless motor according to claim 1, wherein the multi-wire coils have identical or different wire diameters.

8. The nested winding for a slotless motor according to claim 1, wherein each said coil is rhombic, hexagonal, polygonal or in other shapes.

9. The nested winding for a slotless motor according to claim 1, wherein each of the coils forming the multi-phase winding has a phase spread of 60° or 120°, and each said coil is formed by 3*k basic coils, wherein k is 1, 2, 3, 4 . . . .

* * * * *